United States Patent
Holmes et al.

(10) Patent No.: US 11,329,942 B2
(45) Date of Patent: May 10, 2022

(54) METHODS, SYSTEMS, AND MEDIA FOR PRESENTING MESSAGES RELATED TO NOTIFICATIONS

(71) Applicant: Google LLC, Mountain View, CA (US)

(72) Inventors: Brian Holmes, Santa Monica, CA (US);
Jeb Havens, Los Angeles, CA (US);
Nathan Hunt, Los Angeles, CA (US);
Shaina Krevat, San Diego, CA (US)

(73) Assignee: Google LLC, Mountain View, CA (US)

(*) Notice: Subject to any disclaimer, the term of this patent is extended or adjusted under 35 U.S.C. 154(b) by 735 days.

(21) Appl. No.: 15/192,852

(22) Filed: Jun. 24, 2016

(65) Prior Publication Data
US 2017/0374004 A1    Dec. 28, 2017

(51) Int. Cl.
| H04L 12/58 | (2006.01) |
| H04L 29/08 | (2006.01) |
| G06F 3/0484 | (2013.01) |
| H04L 51/224 | (2022.01) |
| H04L 67/306 | (2022.01) |
| H04L 51/10 | (2022.01) |
| G06F 3/04842 | (2022.01) |
| H04L 12/18 | (2006.01) |

(52) U.S. Cl.
CPC .......... *H04L 51/24* (2013.01); *G06F 3/04842* (2013.01); *H04L 12/1895* (2013.01); *H04L 51/10* (2013.01); *H04L 67/306* (2013.01)

(58) Field of Classification Search
CPC ..... G06F 3/04842; H04L 51/24; H04L 51/10; H04L 12/1895; H04L 67/306
See application file for complete search history.

(56) References Cited

U.S. PATENT DOCUMENTS

| 7,743,340 B2 * | 6/2010 | Horvitz ................ G05B 19/404 715/710 |
| 8,117,623 B1 * | 2/2012 | Malasky ................ G06F 9/543 715/727 |
| 9,473,819 B1 * | 10/2016 | Bostick ............ H04N 21/44222 |
| 10,204,086 B1 * | 2/2019 | Johnston ............... G06F 40/134 |
| 10,320,728 B2 * | 6/2019 | Patierno .................. H04L 51/10 |
| 10,616,162 B1 * | 4/2020 | Zhao ....................... H04L 51/10 |

(Continued)

*Primary Examiner* — Tadesse Hailu
(74) *Attorney, Agent, or Firm* — Byrne Poh LLP

(57) ABSTRACT

Methods, systems, and media for presenting messages related to notifications are provided. In some embodiments, the method comprises: determining notification settings; determining that a notification of a particular type of notification is to be presented on a user device, wherein the particular type of notification is a notification that indicates recommended content to a user of the user device; causing the notification to be presented on the user device; determining that a message containing information related to the notification is to be presented on the user device, wherein the message includes a selectable input that, when selected, causes a user interface for modifying the notification settings to be presented; causing the message to be presented concurrently with the notification on the user device; in response to determining that the selectable input has been selected, causing the user interface for modifying the notification settings to be presented on the user device.

21 Claims, 6 Drawing Sheets

(56) References Cited

U.S. PATENT DOCUMENTS

| | | | | |
|---|---|---|---|---|
| 2002/0049804 A1* | 4/2002 | Rodriguez | G06Q 30/06 |
| | | | 709/200 |
| 2003/0226146 A1* | 12/2003 | Thurston | H04N 5/44543 |
| | | | 725/46 |
| 2004/0003395 A1* | 1/2004 | Srinivas | H04N 5/445 |
| | | | 725/34 |
| 2007/0094292 A1* | 4/2007 | Kataoka | H04N 21/482 |
| 2011/0273281 A1* | 11/2011 | Adams | G06Q 10/109 |
| | | | 340/309.16 |
| 2012/0304223 A1* | 11/2012 | Sargent | H04N 21/44016 |
| | | | 725/32 |
| 2013/0007665 A1* | 1/2013 | Chaudhri | H04L 51/24 |
| | | | 715/830 |
| 2014/0129661 A1* | 5/2014 | Thyagaraja | G06F 9/542 |
| | | | 709/207 |
| 2014/0289384 A1* | 9/2014 | Kao | H04L 51/12 |
| | | | 709/223 |
| 2015/0269009 A1* | 9/2015 | Faaborg | A61B 5/6898 |
| | | | 719/315 |
| 2015/0339004 A1* | 11/2015 | Haydn | G06F 9/451 |
| | | | 715/825 |
| 2016/0042404 A1* | 2/2016 | Joshi | H04L 51/10 |
| | | | 705/14.55 |
| 2017/0187665 A1* | 6/2017 | Ju | H04L 51/32 |
| 2018/0131657 A1* | 5/2018 | Shepherd | H04L 51/24 |

\* cited by examiner

METHODS, SYSTEMS, AND MEDIA FOR PRESENTING MESSAGES RELATED TO NOTIFICATIONS

TECHNICAL FIELD

The disclosed subject matter relates to methods, systems, and media for presenting messages related to notifications.

BACKGROUND

Many websites and applications may want to occasionally provide notifications to their users. For example, a video sharing service may want to notify a user of a new video that has been identified as likely to be of interest to the user. However, users may not understand why a particular notification is being presented to them or how to disable a particular type of notification.

Accordingly, it is desirable to provide new methods, systems, and media for presenting messages related to notifications.

SUMMARY

Methods, systems, and media for presenting messages related to notifications are provided.

In accordance with some embodiments of the disclosed subject matter, methods for presenting messages related to notifications are provided, the methods comprising: determining notification settings for a user device on which a user account has been authenticated; determining that a notification of a particular type of notification is to be presented on the user device, wherein the particular type of notification is a notification that indicates recommended content to a user of the user device; causing the notification to be presented on the user device; determining that a message containing information related to the notification is to be presented on the user device, wherein the message includes a selectable input that, when selected, causes a user interface for modifying the notification settings to be presented; causing the message to be presented concurrently with the notification on the user device; in response to determining that the selectable input has been selected, causing the user interface for modifying the notification settings to be presented on the user device.

In accordance with some embodiments of the disclosed subject matter, systems for presenting messages related to notifications are provided, the systems comprising: a hardware processor that is programmed to: determine notification settings for a user device on which a user account has been authenticated; determine that a notification of a particular type of notification is to be presented on the user device, wherein the particular type of notification is a notification that indicates recommended content to a user of the user device; cause the notification to be presented on the user device; determine that a message containing information related to the notification is to be presented on the user device, wherein the message includes a selectable input that, when selected, causes a user interface for modifying the notification settings to be presented; cause the message to be presented concurrently with the notification on the user device; in response to determining that the selectable input has been selected, cause the user interface for modifying the notification settings to be presented on the user device.

In accordance with some embodiments of the disclosed subject matter, non-transitory computer-readable media containing computer executable instructions that, when executed by a processor, cause the processor to perform a method for presenting messages related to notifications, the method comprising: determining notification settings for a user device on which a user account has been authenticated; determining that a notification of a particular type of notification is to be presented on the user device, wherein the particular type of notification is a notification that indicates recommended content to a user of the user device; causing the notification to be presented on the user device; determining that a message containing information related to the notification is to be presented on the user device, wherein the message includes a selectable input that, when selected, causes a user interface for modifying the notification settings to be presented; causing the message to be presented concurrently with the notification on the user device; in response to determining that the selectable input has been selected, causing the user interface for modifying the notification settings to be presented on the user device.

In accordance with some embodiments of the disclosed subject matter, systems for presenting messages related to notifications are provided, the systems comprising: means for determining notification settings for a user device on which a user account has been authenticated; means for determining that a notification of a particular type of notification is to be presented on the user device, wherein the particular type of notification is a notification that indicates recommended content to a user of the user device; means for causing the notification to be presented on the user device; means for determining that a message containing information related to the notification is to be presented on the user device, wherein the message includes a selectable input that, when selected, causes a user interface for modifying the notification settings to be presented; means for causing the message to be presented concurrently with the notification on the user device; in response to determining that the selectable input has been selected, means for causing the user interface for modifying the notification settings to be presented on the user device.

In some embodiments, the means for determining that the message is to be presented comprises means for determining that a number of impressions of messages related to the particular type of notification previously presented on a plurality of user devices on which the user account has been authenticated is less than a predetermined threshold, wherein the plurality of user devices includes the user device.

In some embodiments, an instance of a presentation of a message is considered an impression if the message is presented for more than a predetermined duration of time.

In some embodiments, the message further includes a second selectable input that, when selected, causes notifications of the particular type of notification to be disabled.

In some embodiments, the system further comprises: means for determining that the second selectable input has been selected; and in response to determining that the second selectable input has been selected, means for updating the notification settings associated with the user account to indicate that notifications of the particular type of notification are to be inhibited.

In some embodiments, the system further comprises means for presenting a second message that indicates that notifications of the particular type of notification are currently enabled for the user account prior to presentation of the notification based on the notification settings.

In some embodiments, the second message includes a third selectable input that, when selected, causes presentation of notifications on the user device to be inhibited.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1B:
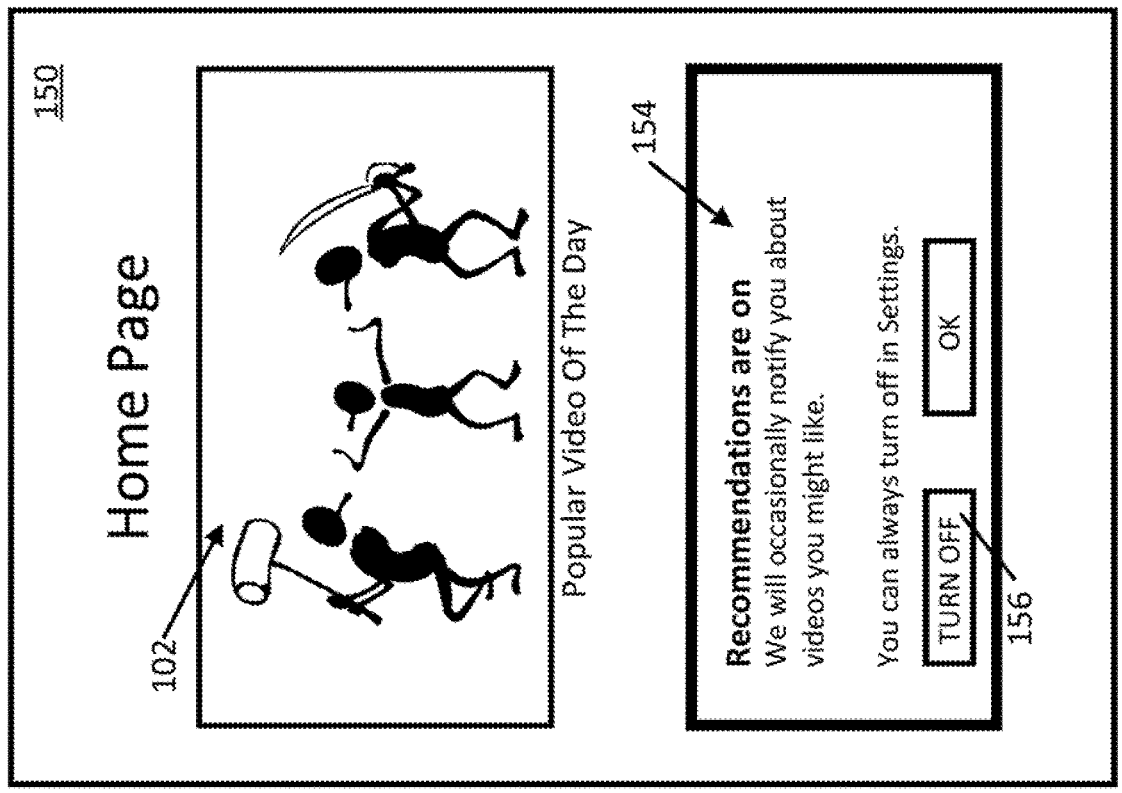
FIGS. 1A and 1B show examples of user interfaces for indicating that notifications have been enabled for a user account in accordance with some embodiments of the disclosed subject matter.

In accordance with various embodiments, mechanisms (which can include methods, systems, and media) for presenting messages related to notifications are provided.

In accordance with some embodiments, the mechanisms can determine that a notification is to be presented to a user. In some embodiments, the notification can be associated with a particular website and/or application, such as a media content sharing service, a social networking service, and/or any other suitable website or application. In some embodiments, the notification can indicate any suitable information. For example, in some embodiments, the notification can indicate a media content item that has been identified as likely to be of interest to the user. As another example, in some embodiments, the notification can indicate one or more new features available for use by the user on a website or application providing the notification. In some embodiments, the notification can be presented at any suitable time, such as in response to determining that the user has navigated to a particular page (e.g., a home page of a particular website or service, and/or any other suitable page), in response to determining that a media content item likely to be of interest to the user has been identified, and/or at any other suitable time.

In some embodiments, the mechanisms can determine that a message related to the notification is to be presented concurrently with the notification. For example, in some embodiments, the message can provide an explanation of the notification, an explanation for why the user is receiving the notification, an explanation for how the user can disable the notification, and/or any other suitable information, thereby providing content for the concurrently presented notification. In some embodiments, the message can include any suitable selectable inputs that, when selected, cause notifications to be disabled and/or cause a particular type of notification (e.g., notifications related to content recommendations) to be disabled. Additionally or alternatively, in some embodiments, the message can include a selectable input that, when selected, causes a user interface that allows a user to manage and/or modify settings related to notifications to be presented. Note that, in some embodiments, a message can additionally or alternatively be presented prior to presentation of the notification (e.g., a message indicating that notifications are currently enabled, and/or any other suitable type of message). In some embodiments, the message can automatically be dismissed, for example, in response to determining that a predetermined duration of time (e.g., one second, three seconds, and/or any other suitable duration of time) has elapsed.

In some embodiments, the mechanisms can determine whether or not the message is to be presented based on any suitable information. For example, in some embodiments, the mechanisms can determine a number of times a similar message (e.g., a message related to a similar type of notification) has previously been presented to the user, and can determine that the message is to be presented if similar messages have been presented to the user fewer than a predetermined number of times (e.g., fewer than three times, fewer than five times, and/or any other suitable number). In some embodiments, the mechanisms can synchronize a number of times messages have been presented to a user across multiple user devices used by the user based on a user account authenticated on each of the user devices.

Note that, in some embodiments, presentation of notifications can be enabled by default for a particular user account. In some embodiments, a user of the user account can disable all notifications and/or notifications of a particular type (e.g., content recommendations, and/or any other suitable type of notification) through a user interface control associated with the notification, a user interface control associated with a message relating to a concurrently presented notification, and/or through a settings panel associated with the user account.

Figure 1A:
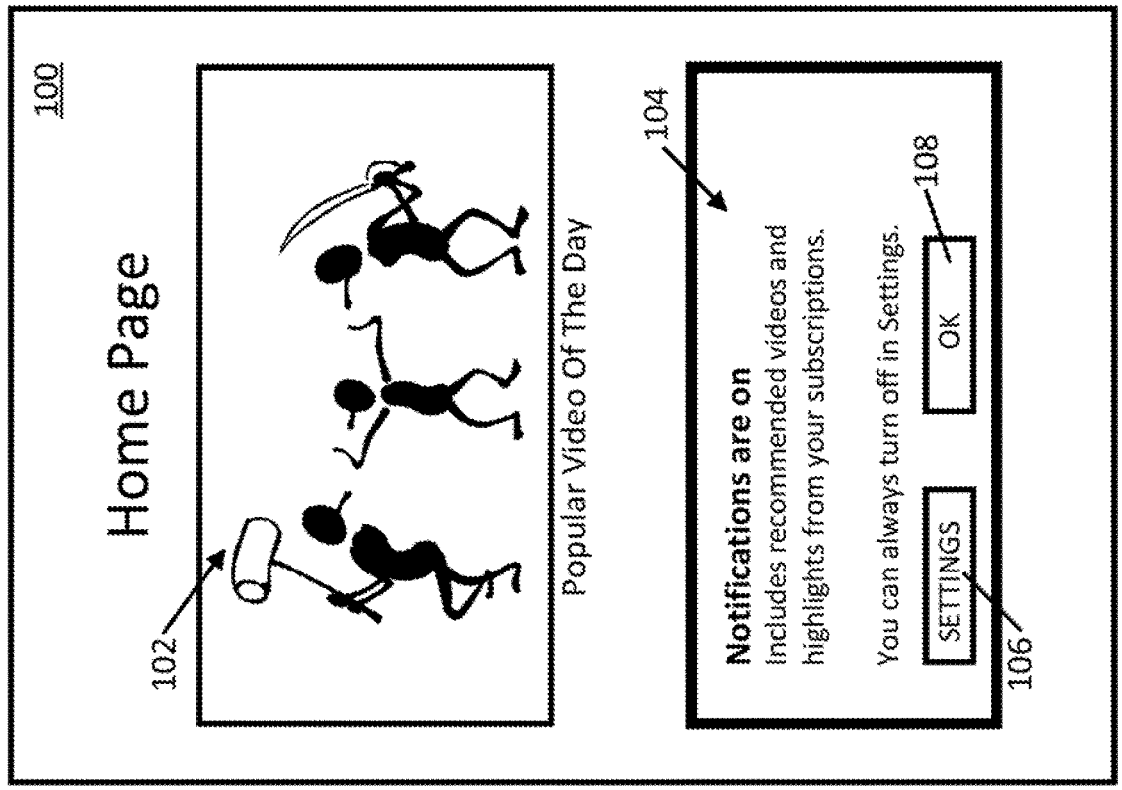

Turning to FIGS. 1A and 1B, examples 100 and 150 of user interfaces for indicating that notifications have been enabled for a particular user account are shown in accordance with some embodiments of the disclosed subject matter.

As illustrated in FIGS. 1A and 1B, in some embodiments, indications that notifications have been enabled can be presented as messages within a user interface that presents a home page of a particular web site or media sharing service (e.g., a video sharing service, and/or any other suitable media sharing service). In some embodiments, the home page can present any suitable content 102, such as a currently popular media content item, a welcome message, and/or any other suitable content.

In some embodiments, a message can be presented that indicates that notifications are enabled for the user account, as shown in FIG. 1A. In some such embodiments, the message can describe types of notifications, as shown in message 104. In some embodiments, message 104 can be a modal message box that can require user interaction before message 104 is dismissed. For example, as shown in FIG. 1A, message 104 can include one or more selectable inputs, such as a settings input 106 and an acknowledgement input 108. In some embodiments, selection of settings input 106 can cause a user interface that allows a user to modify various settings related to notifications to be presented. In some embodiments, selection of acknowledgement input 108 can cause message 104 to be dismissed. Alternatively, in some embodiments, message 104 can be automatically dismissed in response to determining that more than a predetermined duration of time (e.g., more than one second, more than three seconds, more than five seconds, and/or any other suitable duration of time) has elapsed.

Additionally or alternatively, in some embodiments, a message can be presented that describes a particular type of notification that is enabled for the user account, as shown in message 154 of FIG. 1B. For example, in some embodiments, the type of notification can be a notification that indicates recommendations for content a user associated with the user account is likely to enjoy. Similarly to message 104, in some embodiments, message 154 can be a modal message box that can require user interaction before message 154 is dismissed. For example, as shown in FIG. 1B, message 154 can include one or more selectable inputs, such as a disable notifications input 156. In some embodiments, selection of disable notifications input 156 can cause future notifications of the notification type associated with message 156 to no longer be presented in connection with the user account. In some embodiments, an indication that disable notifications input 156 has been selected can be transmitted to a suitable server, such as data server 304 as shown in and described below in connection with FIG. 3. Note that, in some embodiments, message 156 can be automatically dismissed in response to determining that more than a predetermined duration of time (e.g., more than one second, more than three seconds, more than five seconds, and/or any other suitable duration of time) has elapsed.

Figure 2B:
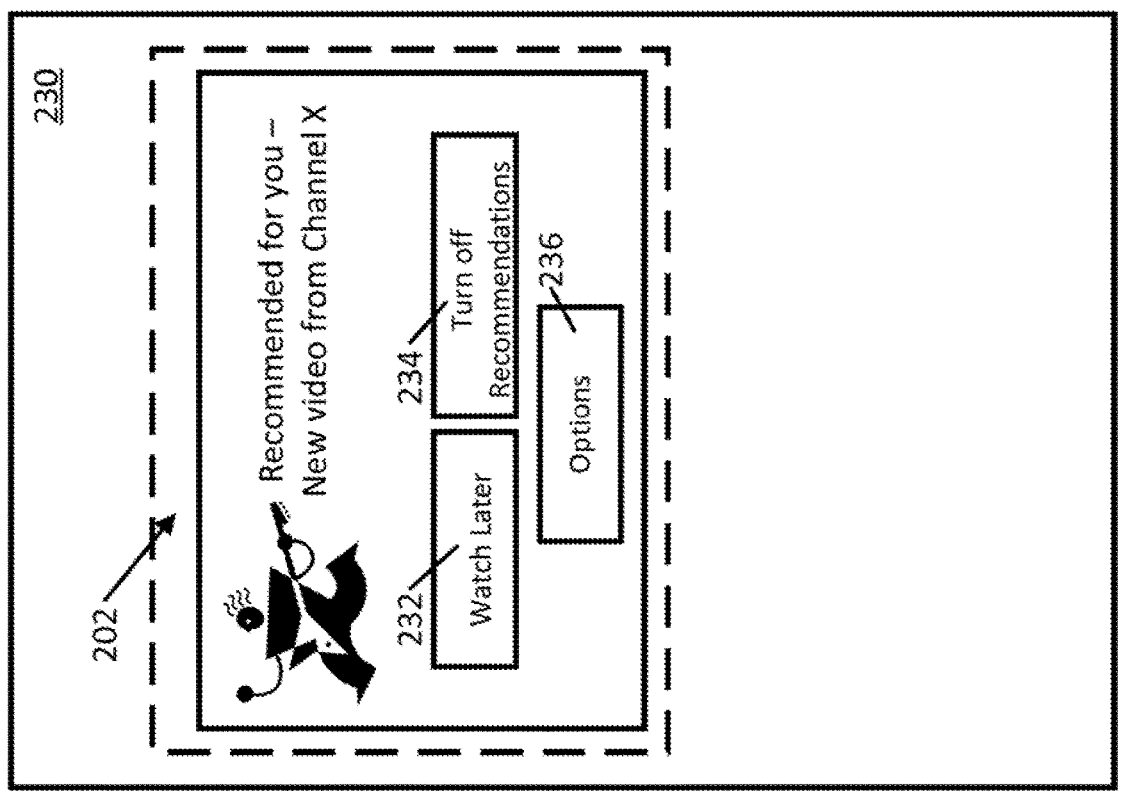
FIGS. 2A and 2B show examples of user interfaces for allowing a user to disable notifications while being presented with a notification in accordance with some embodiments of the disclosed subject matter.
Figure 2A:
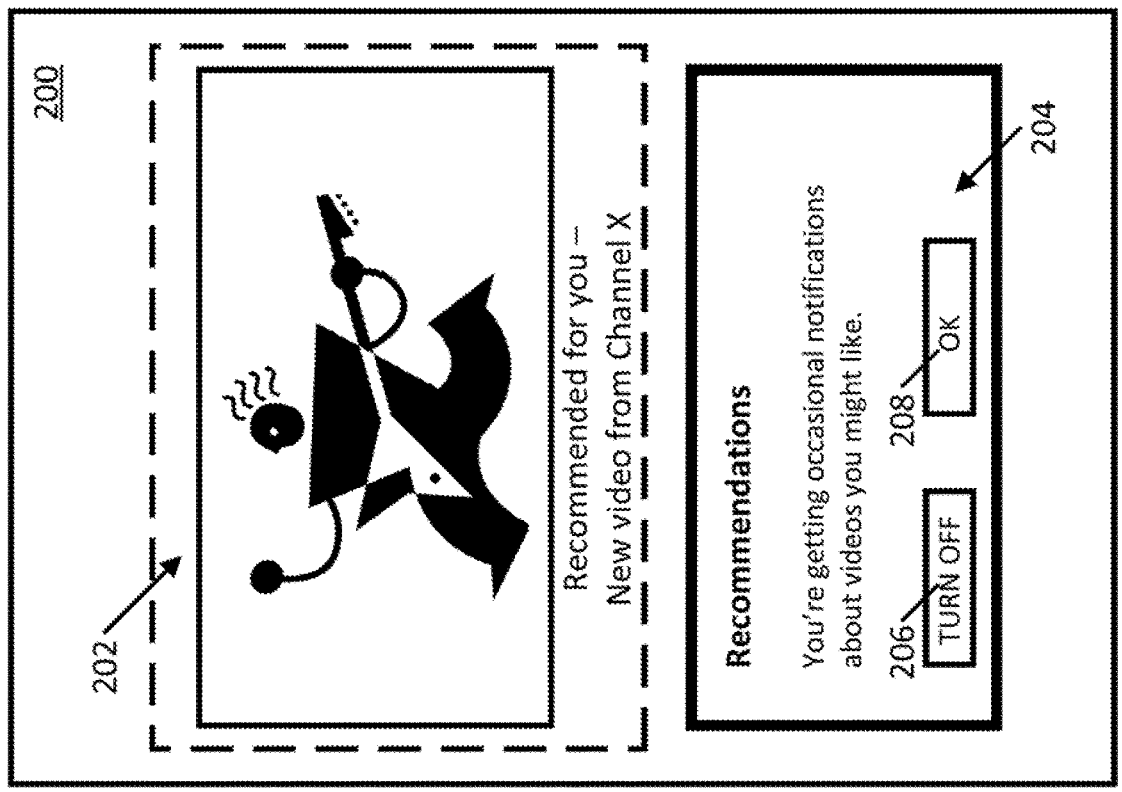

Turning to FIG. 2A, an example 200 of a user interface for presenting a message related to a notification is shown in accordance with some embodiments of the disclosed subject matter. As illustrated, in some embodiments, user interface 200 can include a recommendation notification 202 and a message 204.

Recommendation notification 202 can be any suitable notification. For example, as shown in FIG. 2A, recommendation notification 202 can indicate a media content item that is being recommended to a user. In some embodiments, the media content item can be identified based on previous media content viewed by the user (e.g., by identifying media content similar to the previously viewed content), based on collections of media content the user has subscribed to (as shown in FIG. 2A), based on topics or genres of media content the user has expressed interest in, and/or based on any other suitable information. In some embodiments, recommendation notification 202 can include any suitable content, such as an image associated with the recommended content, a title associated with the recommended content, a reason the media content is being recommended (e.g., because the user previously viewed content created by the same content creator, because the user previously viewed content belonging to the same collection of content, because the user has subscribed to a collection of media content that includes the media content item, and/or any other suitable reason), and/or any other suitable information. In some embodiments, selection of recommendation notification 202 can cause presentation of the recommended media content item to begin.

In some embodiments, message 204 can include text that describes recommendation notification 202. For example, as shown in FIG. 2A, message 204 can explain that recommendation notification 202 is indicating a media content item that has been identified as one the user is likely to enjoy. Note that, in some embodiments, message 204 can be presented concurrently with recommendation notification 202, as shown in FIG. 2A. In some such embodiments, message 204 can be presented in any suitable position relative to recommendation notification 202 (e.g., above, below, and/or in any other suitable position).

In some embodiments, message 204 can include any suitable user interface controls, such as a disable notification input 206 and an acknowledgement input 208. In some embodiments, selection of disable notification input 206 can cause future notifications of the same type as recommendation notification 202 to no longer be presented to the user. For example, in the example shown in FIG. 2B, selection of disable notification input 206 can cause notifications that recommend particular media content items to no longer be presented. In some embodiments, selection of acknowledgement input 208 can cause message 204 to be dismissed. Alternatively, in some embodiments, message 204 can be automatically dismissed, for example, in response to determining that more than a predetermined duration of time (e.g., more than one second, more than three seconds, and/or more than any other suitable duration of time) has elapsed. In some such embodiments, acknowledgement input 208 can be omitted.

Note that, in some embodiments, determination of whether message 204 is to be presented in connection with recommendation notification 202 can be determined using any suitable technique or combination of techniques, as described below in connection with FIG. 5. For example, in some embodiments, message 204 can be presented in response to determining that a similar message relating to the same type of notification has been presented fewer than a predetermined number of times (e.g., fewer than three times, fewer than five times, and/or any other suitable number).

In some embodiments, notification 202 can include user interface controls (e.g., selectable inputs such as push buttons, and/or any other suitable user interface controls) to disable notifications and/or modify notification settings, as shown in user interface 230 of FIG. 2B.

As illustrated, notification 202 can include one or more selectable inputs, such as watch later input 232, disable notifications input 234, and/or modify settings input 236. Note that, although three selectable inputs are shown in notification 202 of FIG. 2B, in some embodiments, any suitable number (e.g., one, two, five, and/or any other suitable number) can be included, and selection of an input can cause any suitable action to occur. In some embodiments, selection of watch later input 232 can cause a video associated with notification 202 to be added to a queue of videos corresponding to a user account associated with user interface 230. For example, in some embodiments, the queue of videos can be those a user of the user account has selected to view at a later time. In some embodiments, selection of disable notifications input 234 can cause notifications of a particular type (e.g., notifications of recommended content, and/or any other suitable type of notifications) to be disabled. In some such embodiments, the particular type of notification that is disabled corresponds to the type of notification associated with notification 202.

Figure 2C:
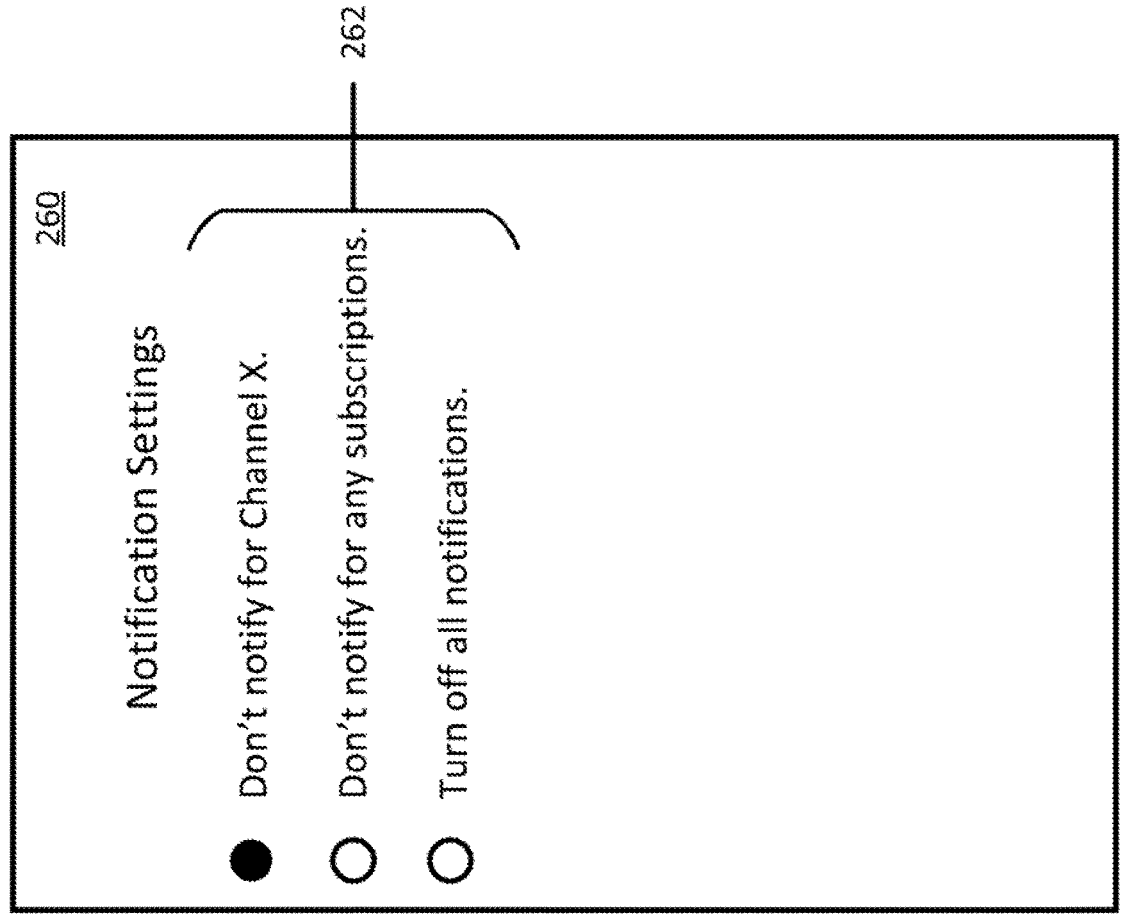
FIG. 2C shows an example of a user interface for allowing a user to modify settings associated with notifications in accordance with some embodiments of the disclosed subject matter.

In some embodiments, selection of modify settings input 236 can cause a user interface to be presented that allows a user to modify settings associated with presentation of notifications, for example, as shown in user interface 260 of FIG. 2C. In some embodiments, user interface 260 can be presented as a new tab in a browser window, as a new browser window, a new pop-up window, a different page within a browser window presenting user interface 230, and/or presented in any other suitable manner.

As shown, in some embodiments, user interface 260 can include a group of notification settings 262 that can be modified by a user. For example, in some embodiments, group of notification settings 262 can include options to disable notifications related to a particular event and/or category (e.g., notifications related to a particular collection of media content, notifications related to a particular event such as addition of content to a particular collection of media content, and/or any other suitable event and/or category). Specific examples of options to disable notifications related to particular events and/or categories can include: "Disable notifications about new content from Channel X," "Disable notifications about content that is about to be removed from Channel X," etc. As another example, in some embodiments, group of notification settings 262 an include options to disable notifications related to a relatively broader category or event (e.g., notifications related to recommended content, notifications related to any collections of media content the user has subscribed to, and/or any other suitable category or event). Specific examples of options to disable notifications related to relatively broader categories and/or events can include: "Disable all notifications for channels I am subscribed to," "Disable all content recommendation notifications," etc. As yet another example, in some embodiments, group of notification settings 262 can include an option to disable all notifications, as shown in FIG. 2C.

In some embodiments, a modification of settings via user interface 260 can be stored in association with an identifier of a particular user account such that the modified settings can be applied to multiple devices that have authenticated the particular user account. For example, in instances where a user disables notifications for a particular event or category, the notifications can be disabled for the user account for any user device used to access the user account. In some embodiments, settings can be stored and/or updated on any suitable device, including locally on a user device and on a server, such as data server 304, as shown in and described below in connection with FIG. 3.

Figure 3:
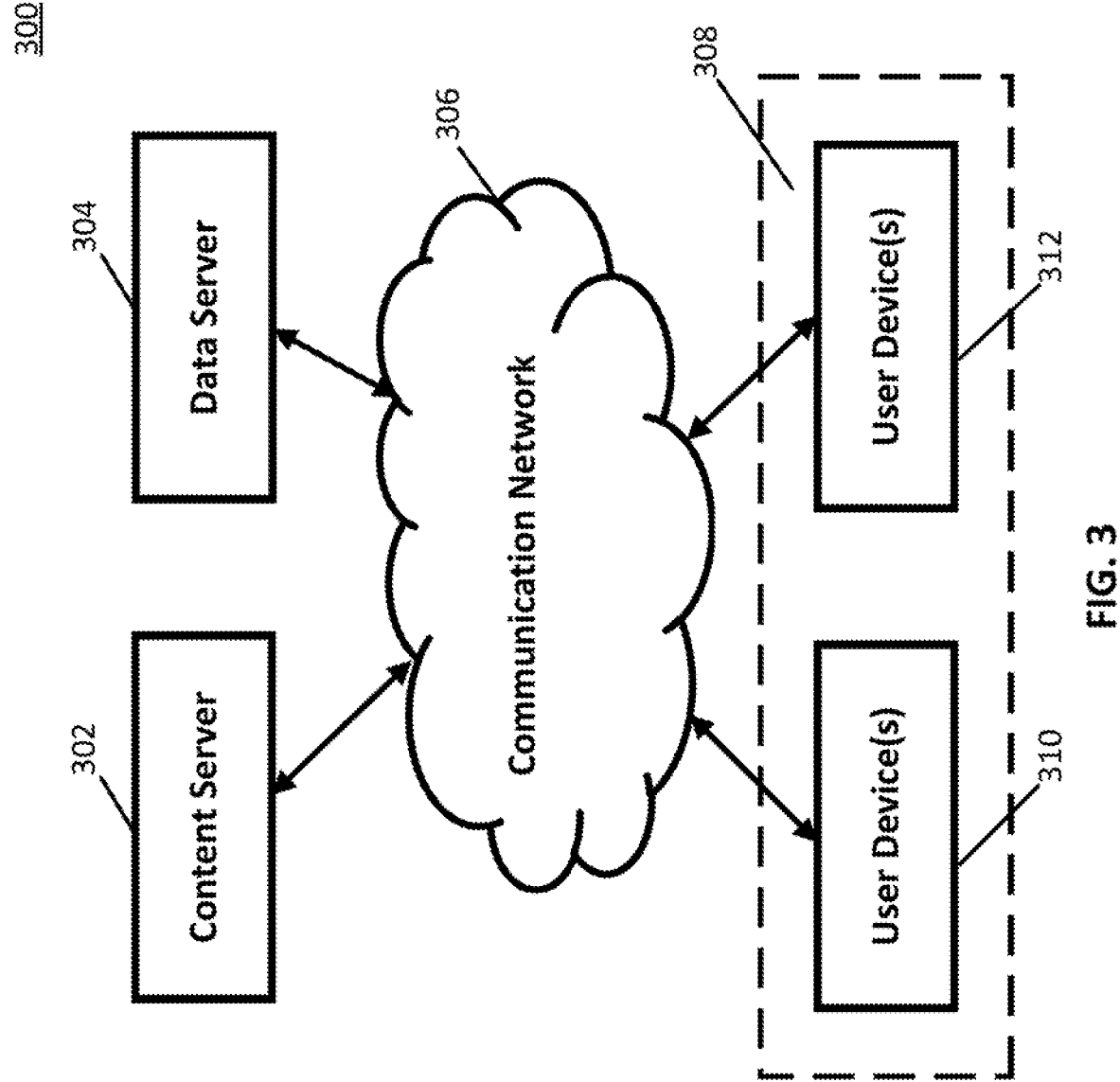
FIG. 3 shows a schematic diagram of an example of a system for presenting notifications in accordance with some embodiments of the disclosed subject matter.

Turning to FIG. 3, an example 300 of hardware for presenting notifications that can be used in accordance with some embodiments of the disclosed subject matter is shown. As illustrated, hardware 300 can include one or more servers, such as a content server 302, a data server 304, a communication network 306, and one or more user devices 308.

Content server 302 can be any suitable server for storing content items and delivering the content items to a user device 308 in some embodiments. For example, content server 302 can be a server that streams content items to user device 308 via communication network 306. As a more particular example, in some embodiments, content server 302 can stream a content item to user device 308 in response to receiving a request for the content item from user device 308. Content provided by content server 302 can be any suitable content, such as video content, audio content, television programs, movies, cartoons, sound effects, audiobooks, web pages, news articles, streaming live content (e.g., a streaming radio show, a live concert, and/or any other suitable type of streaming live content), electronic books, search results and/or any other suitable type of content. Additionally or alternatively, in some embodiments, content server 302 can generate recommendations of content that a user is likely to enjoy and can cause notifications indicating the recommended content to be presented to the user. Content can be created and uploaded to content server 302 by any suitable entity. In some embodiments, content server 302 can be omitted.

Data server 304 can be any suitable server for determining whether a message relating to a notification is to be presented, as described below in connection with FIG. 5. For example, in some embodiments, data server 304 can determine a number of times a message relating to a particular type of notification has been presented to a user associated with a particular user account, and can determine that a message is not to be presented if the number of times a message has previously been presented exceeds a predetermined threshold. In some embodiments, data server 304 can store an indication of each time a message associated with a particular type of notification has been presented in connection with the user account. Additionally, in some embodiments, the indications stored on data server can be synchronized across multiple user devices on which the user account has been authenticated. In some embodiments, data server 304 can be omitted.

Communication network 306 can be any suitable combination of one or more wired and/or wireless networks in some embodiments. For example, communication network 306 can include any one or more of the Internet, a mobile data network, a satellite network, a local area network, a wide area network, a telephone network, a cable television network, a WiFi network, a WiMax network, and/or any other suitable communication network.

User device(s) 308 can include any one or more user devices suitable for presenting notifications, presenting messages related to notifications, presenting media content, and/or performing any other suitable functions. For example, in some embodiments, user device(s) 308 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user device(s) 308 can include non-mobile devices such as a desktop computer, a set-top box, a television, a streaming media player, a game console, or any other suitable non-mobile device.

Although content server 302 and data server 304 are illustrated as separate devices, any one or more of these devices can be combined into one device in some embodiments. Also, although only one each of content server 302 and data server 304 are shown in FIG. 3 to avoid over-complicating the figure, any suitable one or more of each device can be used in some embodiments.

Although only one user device 308 is shown in FIG. 3 to avoid over-complicating the figure, any suitable number of each of these devices, and any suitable types of these devices, can be used in some embodiments.

Figure 4:
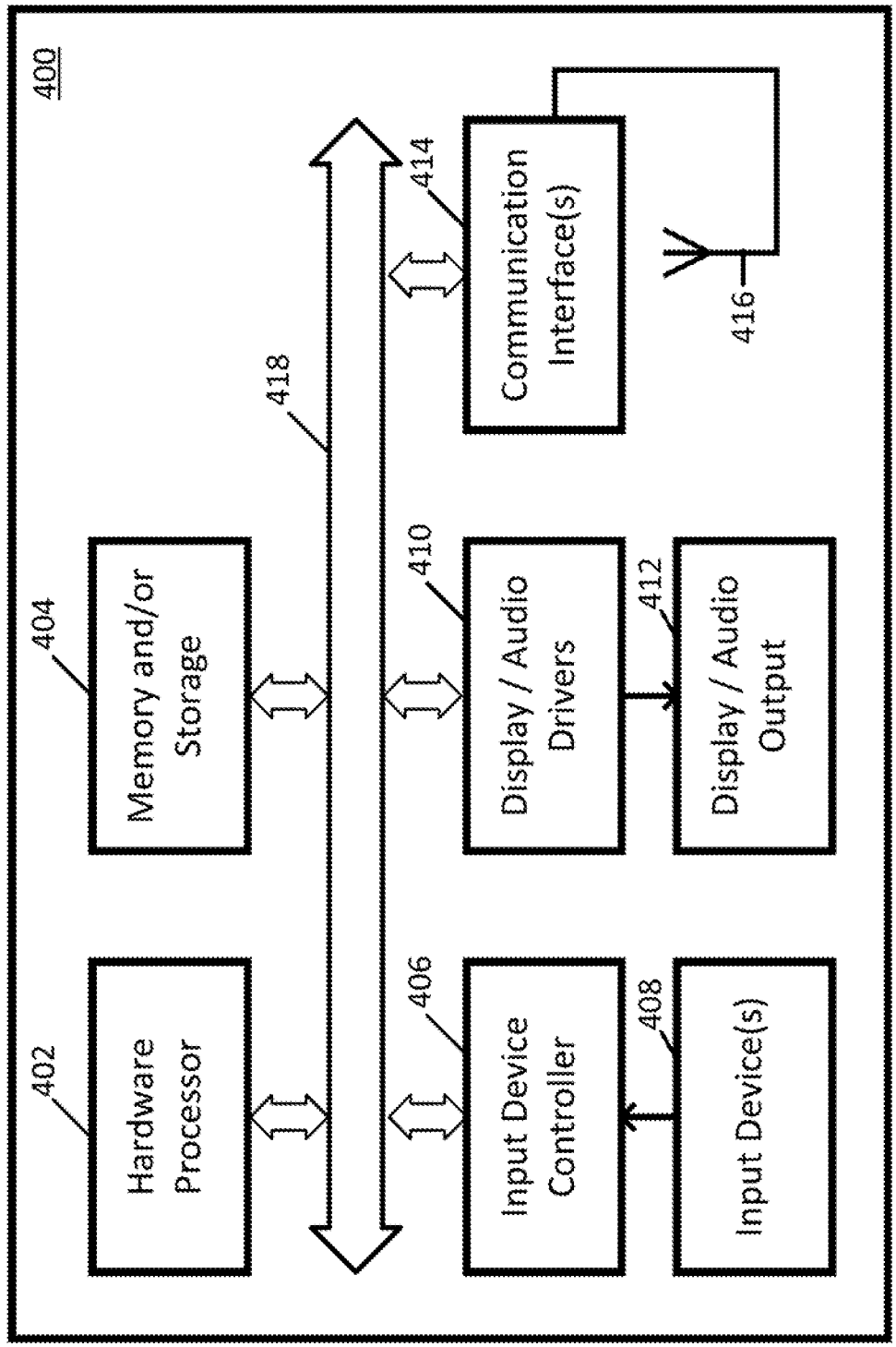
FIG. 4 shows an example of hardware that can be used in a server and/or a user device in accordance with some embodiments of the disclosed subject matter.

Content server 302, data server 304, and user device 308 can be implemented using any suitable hardware in some embodiments. For example, in some embodiments, devices 302, 304, and 308 can be implemented using any suitable general purpose computer or special purpose computer. For example, a server may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 404 can be any suitable memory and/or storage for storing programs, data, media content, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output circuitries 412 in some embodiments. For example, display/audio drivers 410 can be circuitry for driving an LCD display, a speaker, an LED, or any other type of output device.

Communication interface(s) 414 can be any suitable circuitry for interfacing with one or more communication networks, such as network 306 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network in some embodiments. In some embodiments, antenna 416 can be omitted when not needed.

Bus 418 can be any suitable mechanism for communicating between two or more components 402, 404, 406, 410, and 414 in some embodiments.

Any other suitable components can be included in hardware 400 in accordance with some embodiments.

Figure 5:
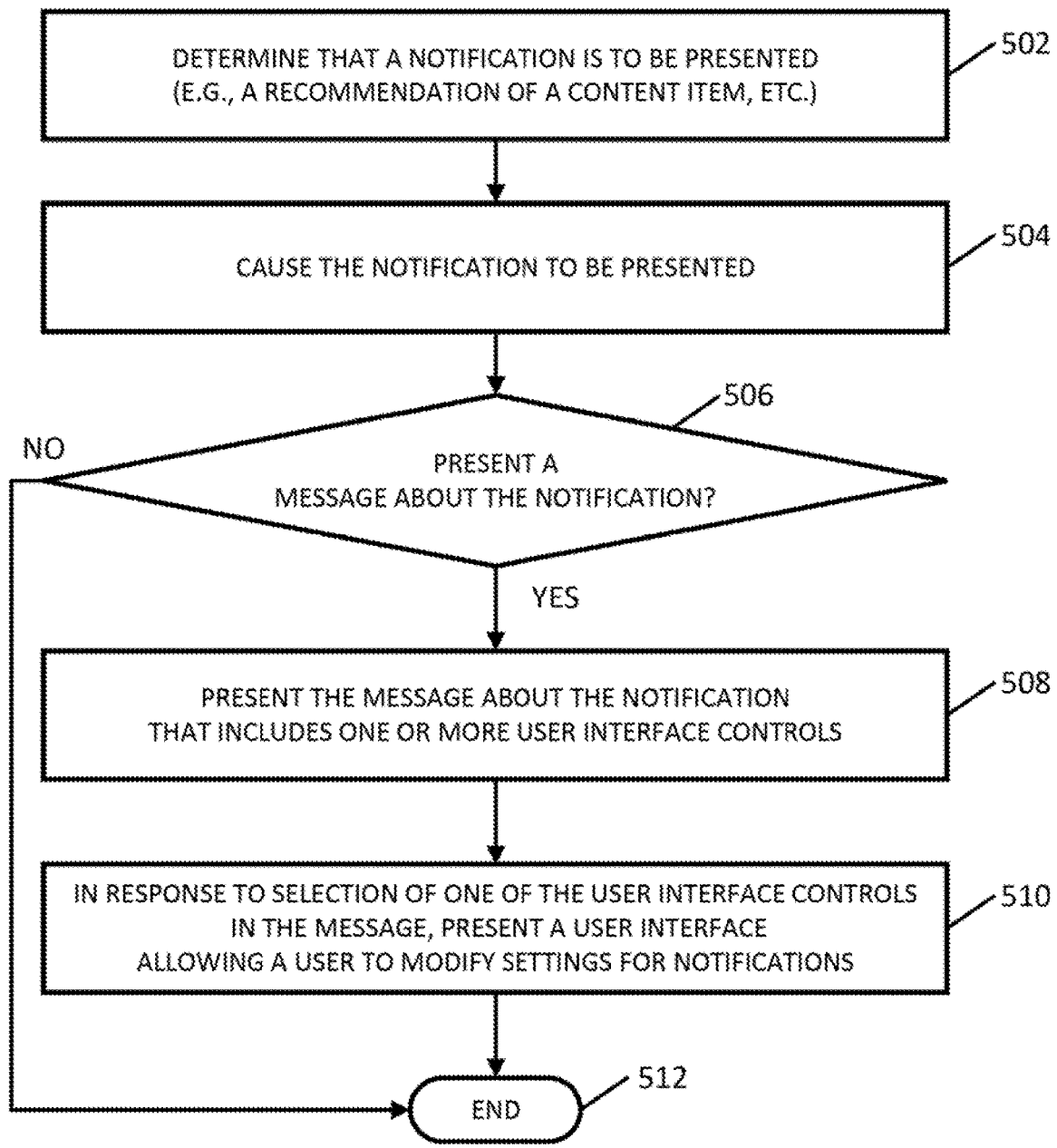
FIG. 5 shows an example of a process for presenting notifications and messages related to notifications in accordance with some embodiments of the disclosed subject matter.

Turning to FIG. 5, an example 500 of a process for presenting notifications and messages related to notifications is shown in accordance with some embodiments of the disclosed subject matter. In some embodiments, blocks of process 500 can be executed by user device 308, content server 302, and/or data server 304.

Process 500 can begin by determining that a notification is to be presented on a user device at 502. In some embodiments, the notification can be related to any suitable information. For example, in some embodiments, the notification can indicate media content that has been identified as likely to be of interest to a user of the user device. As another example, in some embodiments, the notification can indicate that one or more new features are available for use on a website and/or application presenting the notification.

Process 500 can determine that the notification is to be presented based on any suitable information. For example, in some embodiments, process 500 can determine the notification is to be presented in response to determining that a user of the user device has navigated to a particular web page (e.g., a home page of a video sharing service, a home page of a social networking service, and/or any other suitable page). As another example, in some embodiments, process 500 can determine the notification is to be presented in response to determining that a particular content item has been identified as likely to be of interest to the user. As yet another example, in some embodiments, process 500 can determine the notification is to be presented in response to determining that a user of the user device has not yet used one or more features available through the website and/or application.

Note that, in some embodiments, process 500 can determine whether notifications are currently enabled and/or whether notifications of a particular type are currently enabled for the user account to determine that a notification is to be presented. For example, in instances where the notification is related to recommending a particular content item to a user, process 500 can determine whether notifications related to recommended content are currently enabled. In some embodiments, process 500 can determine whether notifications are enabled and/or whether notifications of a particular type are enabled using any suitable techniques, such as querying a database (e.g., on data server 304) for information relating to notifications settings for a particular user account. In some embodiments, presentation of notifications can be enabled by default for a particular user account.

Process 500 can cause a first user interface that includes the notification to be presented at 504. In some embodiments, the notification can include any suitable content, such as an indication of a media content item that has been identified as likely of interest to the user, an indication and/or an explanation of one or more features that are available on the website and/or the application, and/or any other suitable content. In some embodiments, the notification can include any suitable text, images, icons, graphics, animations, videos, hyperlinks, and/or any other suitable content. In some embodiments, selection of the notification can cause any suitable action to occur. For example, in some embodiments, selection of a notification recommending a particular media content item can cause presentation of the media content item to begin.

In some embodiments, the notification can include any suitable user interface controls, such as selectable inputs that, when selected, cause a media content item indicated in the notification to be added to a queue of media content items, cause one or more types of notifications to be disabled, and/or cause a user preferences or settings user interface to be presented (e.g., to modify notification settings associated with the user account), as shown in and described above in connection with FIG. 2B.

In some embodiments, the notification can be dismissed in response to any suitable action. For example, in some embodiments, the notification can be dismissed in response to determining that a user of the user device has swiped the notification, has selected a particular portion of the notification, and/or in response to any other action. Additionally or alternatively, in some embodiments, the notification can automatically be dismissed, for example, in response to determining that more than a predetermined duration of time (e.g., more than one second, more than three seconds, and/or any other suitable duration of time) has elapsed.

At 506, process 500 can determine whether to present a message relating to the notification presented at 504. For example, the message can include an explanation of the notification, an explanation of why the user is receiving the notification, and/or an explanation of how the notification can be disabled, as shown in and described in connection with FIG. 2A. In some embodiments, the message can be presented concurrently with the notification, for example, in a pop-up window below the notification, and/or in any other suitable manner, thereby providing context for the notification presented at 504.

Process 500 can determine whether to present the message using any suitable technique or combination of techniques. For example, in some embodiments, process 500 can determine that the message is to be presented if the same message and/or a similar message has previously been presented to the user fewer than a predetermined number of times (e.g., fewer than three times, fewer than five times, and/or any other suitable number). In some embodiments, a similar message can be one that was directed to the same type of notification as the notification presented at 504 (e.g., a notification about recommended content, and/or any other suitable type of notification). In some embodiments, process 500 can use any suitable criteria to determine that presentation of the message is to be considered an impression. For example, in some embodiments, the criteria can include that the message was presented for more than a predetermined duration of time (e.g., more than one second, more than three seconds, and/or any other suitable duration) prior to being dismissed by the user. Note that, in some embodiments, the duration of time of presentation of the message required to consider presentation of the message as an impression can depend on the type of message and/or the content of the message. For example, in some embodiments, modal messages that require user interaction to dismiss the message can require a different duration of time than messages that are automatically dismissed. As another example, in some embodiments, messages that include more text can require a longer duration of time relative to messages with less text. In some embodiments, process 500 can use any other suitable criteria or combination of criteria for determining that a presentation of a message is to be considered an impression, such as whether a user selected a portion of the message (e.g., selected an acknowledgement of the message, selected a user interface control included in the message, and/or any other suitable portion of the message), whether a user scrolled past the message within a predetermined time range, and/or any other suitable criteria.

Note that, in some embodiments, a number of impressions for a particular message and/or type of message can be stored on any suitable device. For example, in some embodiments, the number of impressions can be stored on data server 304 in association with an identifier of the user account. In some such embodiments, impressions can be aggregated over presentation on multiple user devices in connection with one user account, and process 500 can determine that the message is not to be displayed if the number of impressions over all user devices in connection with the user account exceeds the predetermined number of impressions. For example, in some embodiments, process 500 can determine a total number of times a particular message and/or type of message was presented to a user associated with a particular user account on any user device the user accessed the user account from. In some embodiments, a number of impressions of the message can additionally or alternatively be stored locally in memory 404 of user device 208. In some such embodiments, a local count of the number of impressions can be synchronized with a count stored on data server 304 at any suitable time and/or at any suitable time intervals. Additionally, in some embodiments, the count of the number of impressions can be reset at any suitable time period (e.g., reset to zero every month, and/or any other suitable time point).

If, at 506, process 500 determines that a message is not to be presented ("no" at 506), process 500 can terminate at 512.

If, at 506, process 500 determines that a message is to be presented ("yes" at 506, process 500 can cause the message to be presented at 508. In some embodiments, the message can be presented concurrently with the notification presented at block 504. For example, as shown in FIG. 2A, the message can be presented within the same user interface as the notification (e.g., below the notification, above the notification, and/or at any other suitable position). In some embodiments, the notification can be presented as a pop-up window, and/or in any other suitable manner.

As described above and as shown in FIGS. 1A, 1B, and 2A, the message can have any suitable content. For example, in some embodiments, the message can include an explanation of the notification, an explanation for why the user is being presented with the explanation, directions for disabling the notification, and/or any other suitable information. Additionally or alternatively, in some embodiments, the message can include one or more selectable inputs that, when selected, disable the notification and/or cause a user interface that allows a user to modify settings to be presented. For example, as shown in FIGS. 1B and 2A, the message can include a selectable input to disable notifications related to a particular type of notification (e.g., notifications indicating recommended content, and/or any other suitable type of notification). As another example, as shown in FIG. 1A, the message can include a selectable input that, when selected, causes a user interface that allows a user to modify one or more settings related to presentation of notifications (e.g., as shown in and described above in connection with FIG. 2C). Note that, in some embodiments, the message can have any suitable number (e.g., zero, one, two, three, and/or any other suitable number) and type of selectable inputs, including combinations of selectable inputs not shown in FIGS. 1A, 1B, and 2A. For example, in some embodiments, the message can include a selectable input to present a user interface for modifying notification settings and a selectable input for disabling a particular type of notification.

Note that, although the message presented at 508 is described as being presented in connection with presentation of the notification (e.g., as an explanation of the notification), in some embodiments, the message can be presented prior to presentation of any notifications. For example, in some embodiments, the message additionally or alternatively can be presented in response to determining that a user has navigated to a particular page (e.g., a home page associated with a video sharing service, a home page associated with a social networking service, and/or any other suitable page). In some such embodiments, the message can indicate that notifications are enabled (e.g., as shown in and described above in connection with FIG. 1A) and/or that notifications of a particular type are enabled (e.g, notifications relating to recommended content, as shown in and described above in connection with FIG. 1B). In some such embodiments, the message can additionally include an directions for disabling notifications and/or a selectable input for disabling notifications, as shown in and described above in connection with FIGS. 1A and 1B.

In some embodiments, process 500 can cause the message to be dismissed based on any suitable information. For example, in some embodiments, the message can be automatically dismissed in response to determining that more than a predetermined duration of time has elapsed. As another example, in some embodiments, the message can be dismissed in response to determining that a user has selected a particular portion of the message and/or swiped the message off-screen.

Process 500 can, in response to selection of a particular input from the message presented at block 508, cause a user interface that allows a user to modify settings related to notifications to be presented at 510. For example, in some embodiments, process 500 can cause the user interface to be presented in response to determining that a selectable input corresponding to a settings or options interface was selected on the message. An example of a user interface to modify settings relating to notifications is shown in and described above in connection with FIG. 2C.

Note that, in instances where a user modifies settings related to presentation of notifications (e.g., through a selectable input in a message and/or notification, through a settings panel, and/or in any other suitable manner), process 500 can cause the modified settings to be stored on the user device and/or on data server 304 in association with an identifier of the user account. Process 500 can therefore cause the modified settings to be accessed and used in the future on the same user device and/or on different user devices authenticated with the user account.

It should be understood that at least some of the above described blocks of the processes of FIG. 5 can be executed or performed in any order or sequence not limited to the order and sequence shown in and described in the figure. Also, some of the above blocks of the process of FIG. 5 can be executed or performed substantially simultaneously where appropriate or in parallel to reduce latency and processing times. Additionally or alternatively, some of the above described blocks of the process of FIG. 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting messages related to notifications are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting messages related to notifications, comprising:
    determining notification settings for a user device on which a user account has been authenticated;
    determining that a notification of a particular type of notification is to be presented on the user device, wherein the particular type of notification is a notification that indicates recommended content to a user of the user device;
    causing the notification to be presented on the user device within a first user interface presented in a first portion of a display of the user device;
    determining that a message associated with the notification is to be presented on the user device, wherein the message includes text describing a reason for presentation of the notification, and wherein the message includes a selectable input that, when selected, causes a user interface for modifying the notification settings to be presented, and wherein determining that the message is to be presented comprises determining that a number of impressions of messages, each previously presented in connection with a notification of a same type as the notification presented in the first portion of the display, is less than a predetermined threshold;
    causing the message to be presented concurrently with the notification on the user device, wherein the message is presented within a second user interface presented in a second portion of the display of the user device;
    in response to determining that the selectable input has been selected, causing the user interface for modifying the notification settings to be presented on the user device; and
    in response to determining that more than a predetermined duration of time has elapsed, causing the second user interface that includes the message to no longer be presented in the second portion of the display of the user device while continuing to present the notification that indicates the recommended content in the first portion of the display.

2. The method of claim 1, wherein the number of impressions of messages is counted across a plurality of user devices on which the user account has been authenticated.

3. The method of claim 2, wherein an instance of a presentation of a message is considered an impression if the message is presented for more than a predetermined duration of time.

4. The method of claim 1, wherein the message further includes a second selectable input that, when selected, causes notifications of the particular type of notification to be disabled.

5. The method of claim 4, further comprising:
    determining that the second selectable input has been selected;
    in response to determining that the second selectable input has been selected, updating the notification settings associated with the user account to indicate that notifications of the particular type of notification are to be inhibited.

6. The method of claim 1, further comprising presenting a second message that indicates that notifications of the particular type of notification are currently enabled for the user account prior to presentation of the notification based on the notification settings.

7. The method of claim 6, wherein the second message includes a third selectable input that, when selected, causes presentation of notifications on the user device to be inhibited.

8. A system for presenting messages related to notifications, the system comprising:
 a hardware processor that is programmed to:
  determine notification settings for a user device on which a user account has been authenticated;
  determine that a notification of a particular type of notification is to be presented on the user device, wherein the particular type of notification is a notification that indicates recommended content to a user of the user device;
  cause the notification to be presented on the user device within a first user interface presented in a first portion of a display of the user device;
  determine that a message associated with the notification is to be presented on the user device, wherein the message includes text describing a reason for presentation of the notification, and wherein the message includes a selectable input that, when selected, causes a user interface for modifying the notification settings to be presented, and wherein determining that the message is to be presented comprises determining that a number of impressions of messages, each previously presented in connection with a notification of a same type as the notification presented in the first portion of the display, is less than a predetermined threshold;
  cause the message to be presented concurrently with the notification on the user device, wherein the message is presented within a second user interface presented in a second portion of the display of the user device;
  in response to determining that the selectable input has been selected, cause the user interface for modifying the notification settings to be presented on the user device; and
  in response to determining that more than a predetermined duration of time has elapsed, cause the second user interface that includes the message to no longer be presented in the second portion of the display of the user device while continuing to present the notification that indicates the recommended content in the first portion of the display.

9. The system of claim 8, wherein the number of impressions of messages is counted across a plurality of user devices on which the user account has been authenticated.

10. The system of claim 9, wherein an instance of a presentation of a message is considered an impression if the message is presented for more than a predetermined duration of time.

11. The system of claim 8, wherein the message further includes a second selectable input that, when selected, causes notifications of the particular type of notification to be disabled.

12. The system of claim 11, wherein the hardware processor is further programmed to:
 determine that the second selectable input has been selected;
 in response to determining that the second selectable input has been selected, update the notification settings associated with the user account to indicate that notifications of the particular type of notification are to be inhibited.

13. The system of claim 8, wherein the hardware processor is further programmed to present a second message that indicates that notifications of the particular type of notification are currently enabled for the user account prior to presentation of the notification based on the notification settings.

14. The system of claim 13, wherein the second message includes a third selectable input that, when selected, causes presentation of notifications on the user device to be inhibited.

15. A non-transitory computer-readable medium containing computer executable instructions that, when executed by a processor, cause the processor to perform a method for presenting messages related to notifications, the method comprising:
 determining notification settings for a user device on which a user account has been authenticated;
 determining that a notification of a particular type of notification is to be presented on the user device, wherein the particular type of notification is a notification that indicates recommended content to a user of the user device;
 causing the notification to be presented on the user device within a first user interface presented in a first portion of a display of the user device;
 determining that a message associated with the notification is to be presented on the user device, wherein the message includes text describing a reason for presentation of the notification, and wherein the message includes a selectable input that, when selected, causes a user interface for modifying the notification settings to be presented, and wherein determining that the message is to be presented comprises determining that a number of impressions of messages, each previously presented in connection with a notification of a same type as the notification presented in the first portion of the display, is less than a predetermined threshold;
 causing the message to be presented concurrently with the notification on the user device, wherein the message is presented within a second user interface presented in a second portion of the display of the user device;
 in response to determining that the selectable input has been selected, causing the user interface for modifying the notification settings to be presented on the user device; and
 in response to determining that more than a predetermined duration of time has elapsed, causing the second user interface that includes the message to no longer be presented in the second portion of the display of the user device while continuing to present the notification that indicates the recommended content in the first portion of the display.

16. The non-transitory computer-readable medium of claim 15, wherein number of impressions of messages is counted across a plurality of user devices.

17. The non-transitory computer-readable medium of claim 16, wherein an instance of a presentation of a message is considered an impression if the message is presented for more than a predetermined duration of time.

18. The non-transitory computer-readable medium of claim 15, wherein the message further includes a second selectable input that, when selected, causes notifications of the particular type of notification to be disabled.

19. The non-transitory computer-readable medium of claim 18, wherein the method further comprises:
   determining that the second selectable input has been selected;
   in response to determining that the second selectable input has been selected, updating the notification settings associated with the user account to indicate that notifications of the particular type of notification are to be inhibited.

20. The non-transitory computer-readable medium of claim 15, wherein the method further comprises presenting a second message that indicates that notifications of the particular type of notification are currently enabled for the user account prior to presentation of the notification based on the notification settings.

21. The method of claim 20, wherein the second message includes a third selectable input that, when selected, causes presentation of notifications on the user device to be inhibited.

* * * * *